(12) United States Patent
Steenson, Jr. et al.

(10) Patent No.: US 8,934,776 B2
(45) Date of Patent: Jan. 13, 2015

(54) WIRELESS DATA INTERFACE WITH MULTIPLE, INDEPENDENT TRANSMISSION SOURCES

(75) Inventors: James H. Steenson, Jr., New Boston, NH (US); Derek P. Janiak, Manchester, NH (US); Benjamin W. Brown, Hollis, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 520 days.

(21) Appl. No.: 13/377,992

(22) PCT Filed: Apr. 5, 2011

(86) PCT No.: PCT/US2011/031184
§ 371 (c)(1),
(2), (4) Date: Dec. 13, 2011

(87) PCT Pub. No.: WO2011/162852
PCT Pub. Date: Dec. 29, 2011

(65) Prior Publication Data
US 2012/0177382 A1    Jul. 12, 2012

Related U.S. Application Data

(60) Provisional application No. 61/322,320, filed on Apr. 9, 2010.

(51) Int. Cl.
*G02B 6/00*    (2006.01)
*H04B 10/00*   (2013.01)

(52) U.S. Cl.
CPC ..................................... *H04B 10/22* (2013.01)
USPC ................................ 398/114; 398/52; 398/55

(58) Field of Classification Search
CPC ....................................................... G02B 6/3604
USPC ............................................ 398/114, 52, 55
See application file for complete search history.

(56) References Cited

U.S. PATENT DOCUMENTS

| | | |
|---|---|---|
| 4,447,114 A | 5/1984 | Koene |
| 4,900,117 A | 2/1990 | Chen |

(Continued)

FOREIGN PATENT DOCUMENTS

JP        2001-044940        2/2001

*Primary Examiner* — Danny Leung
(74) *Attorney, Agent, or Firm* — Maine Cernota & Rardin; Douglas P. Burum

(57) ABSTRACT

A plurality of optical transmission sources provide data communication from a transmitting module to a common detector cooperative with a receiving module, the modules being subject to relative rotation about a shared axis. The detector can be located on the shared axis, each of the sources directing a beam onto the detector regardless of relative module orientation, and/or the light can be diffused, so that it is detected regardless of source and detector placement and relative module orientations. Transmissions can be distinguished according to synchronized timing, differing optical frequencies, differing baud rates, and/or differing circular polarizations. The detector can split the light into a plurality of beams which pass through different optical filters and are thereby distinguished. Cut-off circuits can prevent failed sources from transmitting. A diffused second light source and a second plurality of detectors can provide reverse communication from the receiving module to the transmitting module.

31 Claims, 8 Drawing Sheets

(56) References Cited

U.S. PATENT DOCUMENTS 6,353,693 B1 * 3/2002 Kano et al. .................. 385/26
2009/0067074 A1 * 3/2009 Koitabashi .................. 359/861
2010/0040378 A1 * 2/2010 Koitabashi .................. 398/141
2011/0013913 A1 * 1/2011 Kuo et al. .................. 398/131

* cited by examiner

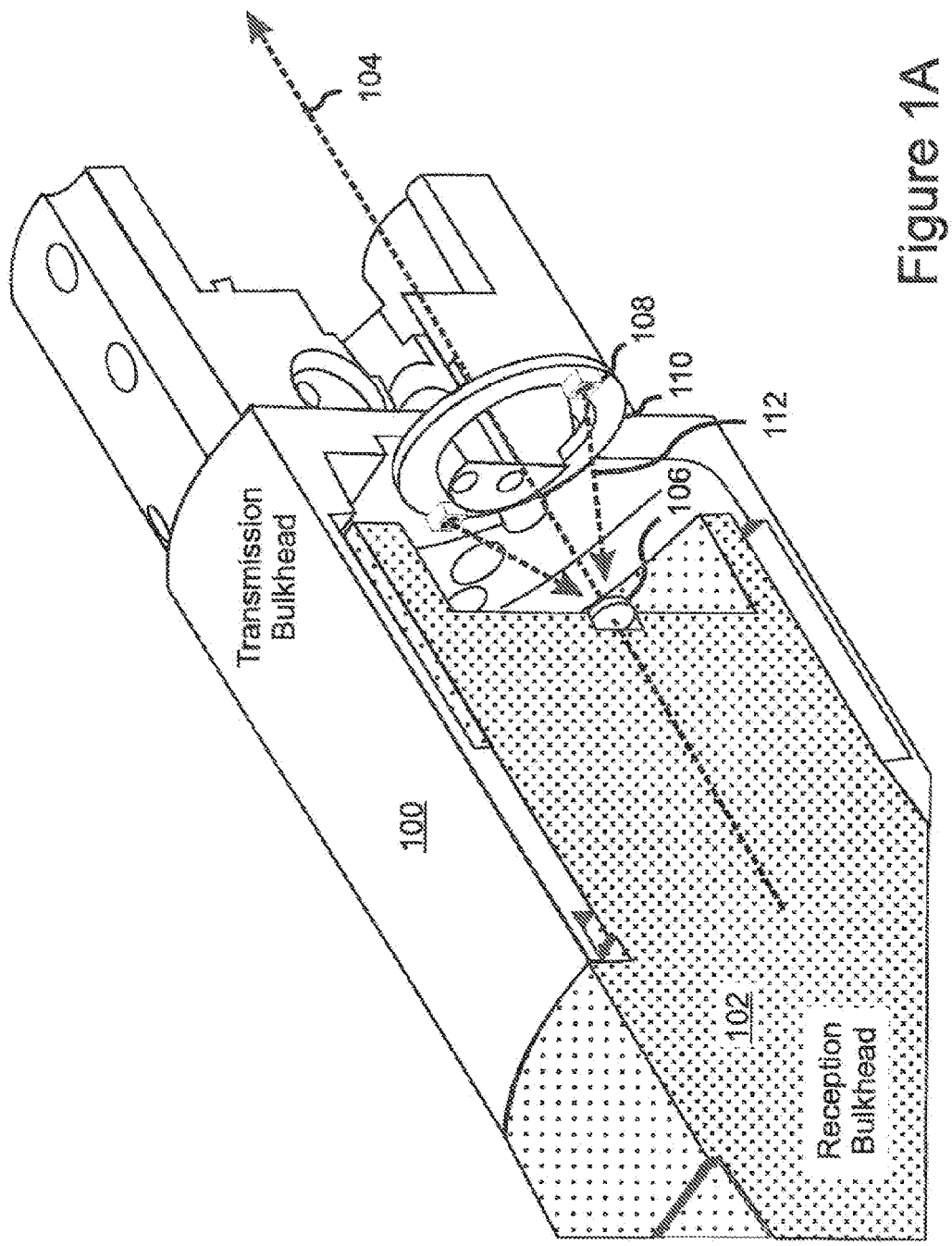

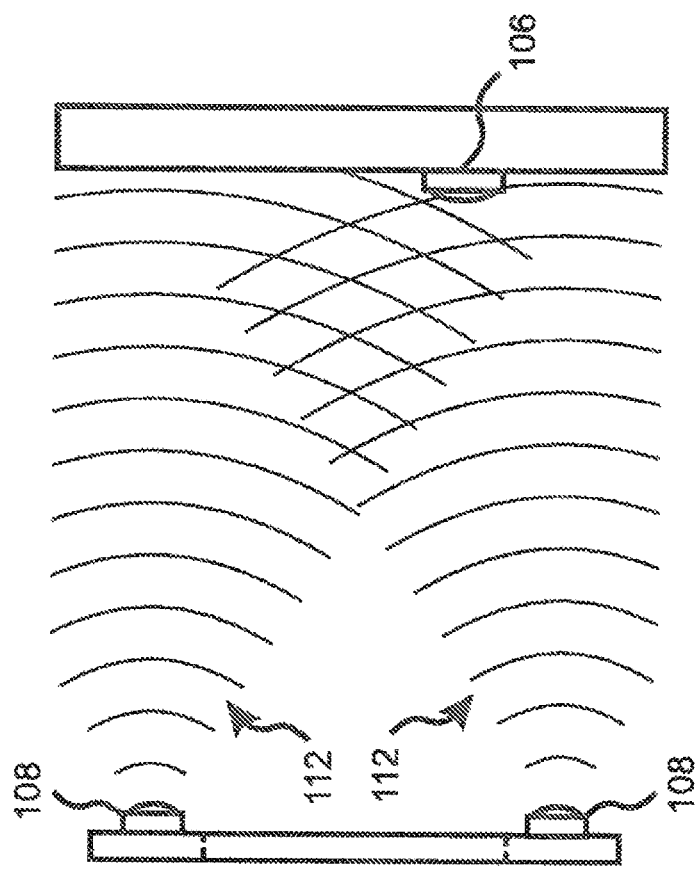

WIRELESS DATA INTERFACE WITH MULTIPLE, INDEPENDENT TRANSMISSION SOURCES

RELATED APPLICATIONS

This application is a national phase application of international application PCT/US11/31184, filed on Apr. 5, 2011, which claims the benefit of U.S. Provisional Application No. 61/322,320, filed Apr. 9, 2010. Both of these applications are herein incorporated by reference in their entirety for all purposes.

STATEMENT OF GOVERNMENT INTEREST

The invention was made with United States Government support under Contract No. DAAHOI-03-C-OOIO awarded by the Army. The United States Government has certain rights in this invention.

FIELD OF THE INVENTION

The invention relates to the field of data communications, and more particularly to data communication interfaces which provide communication between modules which are subject to rotation relative to each other.

BACKGROUND OF THE INVENTION

Communication is often desirable between linked modules which are subject to rotation relative to each other. For example, communication may be desired through a linkage that includes a ball-joint or a gimbal, or communication may be desired between two modules that thread together, whereby the process of threading one module into the other during assembly could lead to twisting, kinking, and possibly breaking of conventional wires. In particular, it is sometimes desirable for a plurality of data transmitting sources, such as sensing and monitoring circuits, to communicate with a receiving destination, such as to a system control module. In various circumstances, the plurality of data transmitting sources may not share a common power supply or ground with each other and/or with the data receiving destination, such that electrical interconnection therebetween could be problematic.

One approach to enabling such communication is to provide lengths of wire or fiber optics which are preconfigured to withstand the mechanical motion required. For example, if two sections are be joined by threading them together, then the connecting wires can be pre-wound in the opposing direction, so that they are unwound as the two sections are joined. However, these approaches are subject to wires or fiber optics being kinked, tangled, and or stretched as the sections are joined.

Another approach to providing such communication is to use mechanically slidable connections such as slip rings, but these are subject to wear and are generally unreliable. And if the data transmitting sources do not share a common ground or power supply with each other and/or with the data receiving destination, direct electrical connection can lead to ground-loops and to other forms of electrical noise and interference.

Another approach is to transmit signals over a wireless radio link such as a wireless network. However, for many applications this approach is too complex, too expensive, and too unreliable, and can also be prone to electronic interference from outside sources.

Yet another approach is to use an optical data link, whereby optical signals, for example from one or more light-emitting diodes, are transmitted by data transmitting sources in one of the modules and are detected by an optical detector cooperative with the data receiving destination located in the other module. It will be understood that the use of the term "optical" herein is not limited to visible light, but is used herein to refer to all frequencies of light, including light in the visible, infrared, and near ultra-violet bands. However, maintaining alignment between the sources and the detector can be difficult. One approach is to position the light source and detector along a mutual rotation axis shared by the two modules. However, this is not always convenient, and is problematic when there is a plurality of data transmitting sources.

U.S. Pat. No. 4,753,506 to Einhorn teaches a solution wherein a plurality of off-axis LED's fixed to one module transmit signals to a single off-axis detector fixed to the other module, whereby the LED's and detector are arranged such that light from at least one of the LED's will always be detected by the detector regardless of the relative angular orientation between the modules. However, the approach of Einhorn is not easily extended to cases where it is necessary for a plurality of sources to communicate with a single receiver.

What is needed, therefore, is a data communication interface which provides electrically isolated signal communication between a plurality of transmitting sources cooperative with a transmitting module to a common signal receiving destination cooperative with a receiving module, the transmitting module and the receiving module being subject to rotations relative to each other about a shared axis.

SUMMARY OF THE INVENTION

The present invention is an optical communication interface which enables electrically isolated optical data transmission from a plurality of data sources cooperative with at least one transmitting module to a common optical signal detector cooperative with a receiving module, the modules being subject to rotations relative to each other about a shared rotation axis.

In some embodiments, the common optical signal detector is located on the shared rotation axis, while at least some of the plurality of optical sources are offset from the shared rotation axis, all of the optical sources being directed toward the common detector such that the light beams from all of the sources impinge on the detector regardless of the relative orientations of the modules about the shared axis.

In other embodiments, the detector is not necessarily on the shared rotation axis, and the light from the optical sources is diffused, so that some light from each of the sources reaches the detector no matter where the sources and the detector are located, and no matter how their relative positions vary as the transmitting and receiving modules are rotated relative to each other.

The communication interface includes a source-distinguishing mechanism which distinguishes between transmissions of the plurality of optical signal sources by one or more of several methods. In some embodiments, the timings of the transmissions are controlled and synchronized, so that transmissions do not overlap, and so that the detector can distinguish the origin of each signal according to its timing. In other embodiments, the optical sources transmit at different baud rates. In still other embodiments source-identifying data, such as an identifying data header, is encoded into each signal. In yet other embodiments, the optical sources transmit on different optical frequencies and/or with different circular polarizations. In some of these embodiments, the detector splits the detected light into a plurality of beams which pass through separate optical filters and are thereby distinguished from one another.

Of course, because the transmissions are optically coupled, the sources and the detector do not need to share a common electrical ground or a common electrical voltage source.

One general aspect of the present invention is an optical communication interface for multi-source communication of data from a transmitting module to a receiving module, the modules being subject to rotation relative to each other about a shared rotation axis. The interface includes an optical detector cooperative with the receiving module, a plurality of optical transmission sources, each of the optical transmission sources being cooperative with one of the transmitting modules, each of the optical transmission sources being able to encode data onto light transmitted by the optical transmission source and detected by the optical detector, and a data-distinguishing mechanism which is able to separate and distinguish the data received by the optical detector from each of the optical transmission sources.

In embodiments, the optical detector is located along the shared rotation axis and at least one of the optical transmission sources is offset from the shared rotation axis. And in some of these embodiments at least one of the optical transmission sources is configured to transmit a directed beam of light onto the optical detector, the directed beam remaining directed onto the optical detector at all relative rotational orientations of the transmitting and receiving modules.

In various embodiments, light transmitted by at least one of the optical transmission sources is diffused, so that the data encoded onto the diffused light is received by the optical detector regardless of the relative rotational orientations of the transmitting and receiving modules.

Certain embodiments further include a light diffuser located between the optical transmission source and the optical detector, so as to diffuse light transmitted by at least one of the optical transmission sources and thereby ensure that the light transmitted by the optical transmission source is received by the optical detector.

In some embodiments the source-distinguishing mechanism includes a beam timing discriminator. In other embodiments, the source-distinguishing mechanism includes a baud rate discriminator. In still other embodiments the source-distinguishing mechanism includes a light frequency detector. And in yet other embodiments the source-distinguishing mechanism includes a light circular polarization state detector.

In various embodiments at least one of the optical transmission sources includes a light emitting diode (LED). And in certain embodiments the light transmitted by at least one of the optical transmission sources is infra-red light.

In some embodiments at least one of the optical transmission sources includes a time-out mechanism which is configured to prevent emission of light from the optical transmission source after a specific time period if the optical transmission source fails in a transmitting mode. And in some of these embodiments the time-out mechanism includes a multivibrator which is triggered by data pulses received from the optical transmission source.

In certain embodiments the optical transmission sources do not share a common ground.

Various embodiments further include a second plurality of optical detectors cooperative with the transmitting modules, a second optical transmission source cooperative with the receiving module, and a diffusing mechanism configured to diffuse light emitted by the second optical transmission source so as to cause the light emitted by the second optical transmission source to impinge upon all of the second plurality of optical detectors.

Another general aspect of the present invention is a method for multi-source communication of data from at least one transmitting module to a receiving module, the modules being subject to rotation relative to each other about a shared rotation axis. The method includes providing an optical detector cooperative with the receiving module, providing a plurality of optical transmission sources, at each of the optical transmission source being cooperative with one of the transmitting modules, transmitting light from the optical transmission sources, the light having the data encoded thereon, detecting the light transmitted by the optical transmission sources using the optical detector, and distinguishing the data transmitted by each of the light transmission sources.

In various embodiments, providing the optical detector includes locating the optical detector along the shared rotation axis. And in some of these embodiments transmitting light includes transmitting of by at least one of the optical transmission sources of a directed beam of light onto the optical detector, the directed beam of light remaining directed onto the optical detector at all relative rotational orientations of the transmitting and receiving modules.

In certain embodiments transmitting light includes transmitting diffused light, so that the data encoded onto the diffused light is received by the optical detector regardless of the relative rotational orientations of the transmitting and receiving modules. In some of these embodiments transmitting diffused light includes transmitting by the optical transmission source of diffused light. And in other of these embodiments transmitting of diffused light includes directing of light through a light diffuser located between the optical transmission source and the optical detector.

In embodiments, transmitting light includes transmitting light at a first frequency from a first optical transmission source of the plurality of optical transmission sources and transmitting light at a second frequency from a second optical transmission source of the plurality of optical transmission sources, and distinguishing the data includes distinguishing between the frequencies of the light transmitted from the first and second optical transmission sources.

In various embodiments transmitting light includes transmitting light at two distinct circular polarization states by two of the optical transmission sources, and distinguishing the data includes distinguishing data transmitted by the two optical transmission sources by distinguishing the circular polarization state of the light from each source.

In certain embodiments transmitting light includes transmitting data at two distinct baud rates by two of the optical transmission sources, and distinguishing the data includes distinguishing the baud rates of the data.

In some embodiments transmitting light includes transmitting light in separated timing intervals, at least two of the optical transmission sources being synchronized so as to ensure that the two sources do not transmit light at the same time, and distinguishing the data includes distinguishing data transmitted by the two optical transmission sources according to the timing intervals of the transmitted light.

In other embodiments transmitting light includes encoding source-identifying data in the transmitted light from at least two of the optical transmission sources, and distinguishing the data includes distinguishing data transmitted by the two optical transmission sources according to the source-identifying data encoded in the transmitted light.

In various embodiments transmitting light includes transmitting light from at least one light emitting diode (LED). And in certain embodiments transmitting light includes transmitting infra-red light.

Certain embodiments further include providing a time-out mechanism configured to prevent emission of light from at least one of the optical transmission sources after a specified time period if the optical transmission source fails in a transmitting mode. And in some of these embodiments the timeout mechanism includes a multivibrator which is triggered by data pulses received from the optical transmission source.

Various embodiments further include providing a second plurality of optical detectors cooperative with the transmitting modules, providing a second optical transmission source cooperative with the receiving module, transmitting light from the second optical transmission source, diffusing the light transmitted by the second optical transmission source so as to cause the light transmitted by the second optical transmission source to impinge upon all of the second plurality of optical detectors, and detecting the light transmitted by the second optical transmission source using the second plurality of optical detectors.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1A is a perspective view of an embodiment of the invention that includes two off-axis sources which transmit to a common on-axis detector;

FIG. 1C is a side illustration of an embodiment of the invention wherein two off-axis sources emit diffused light which is detected by a common off-axis detector;

DETAILED DESCRIPTION

Figure 1B:
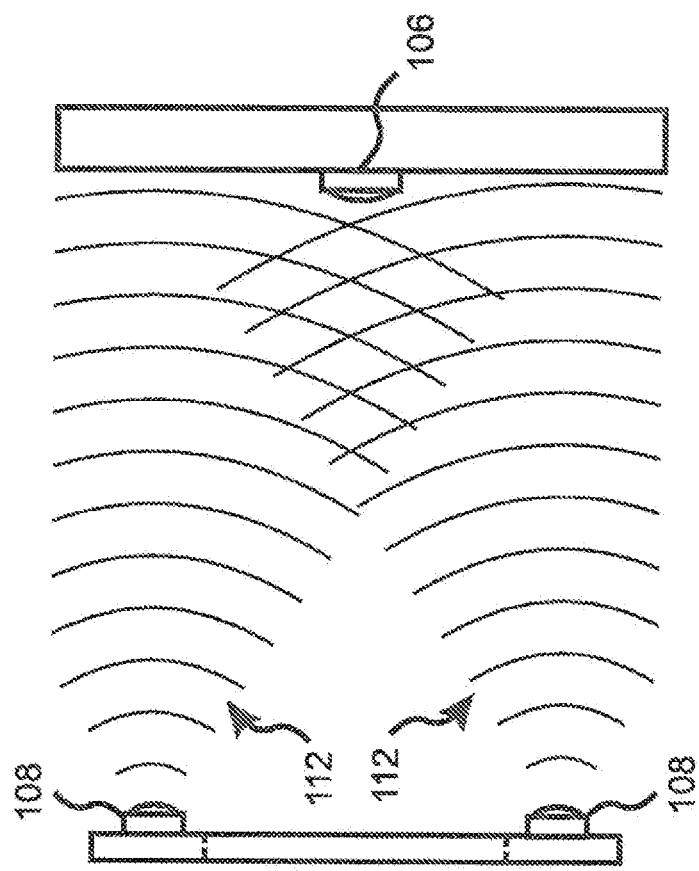
FIG. 1B is a side illustration of an embodiment of the invention wherein two off-axis sources emit diffused light which is detected by a common on-axis detector.

With reference to FIG. 1A, the present invention is a communication interface which enables optical communication between two or more modules 100, 102 which are subject to rotation relative to each other about a shared rotation axis 104. The communication interface includes a common optical detector 106 which is cooperative with the receiving module 100 and a plurality of optical transmission sources 108, each of which is cooperative with one of the transmitting modules 102, and at least one of which is offset from the shared rotation axis 104. In the embodiment of FIG. 1A, the optical detector 106 is located on the shared rotation axis 104, and the optical transmission sources 108 are directed toward the common detector 106, so that light 112 transmitted from the sources 108 will impinge on the detector 106 regardless of rotations of one module 100 relative to the other 102. In the specific embodiment of FIG. 1A, two sources 108 are located on a ring 110 which is fixed to a single transmitting module 102 and is coaxial about the shared rotation axis 104.

FIG. 1B is a simplified side view of an embodiment wherein the optical transmission sources 108 emit diffused light 112, either due to the nature of their design or due to placement of a diffuser (not shown) in the optical path. Due to the diffusion of the light 112, light from each of the optical transmission sources 108 will be detected by the optical detector 106 regardless of the locations of the sources 108 and detector 106, and regardless of the relative orientation of the modules 100, 102. In FIG. 1B, the optical detector 106 is located on the shared rotation axis 104. In the embodiment of FIG. 1C, the optical detector 106 is offset from the shared rotation axis 104, but is still able to detect light from both of the optical transmission sources 108, regardless of the relative orientations of the two modules 100, 102.

Figure 1D:
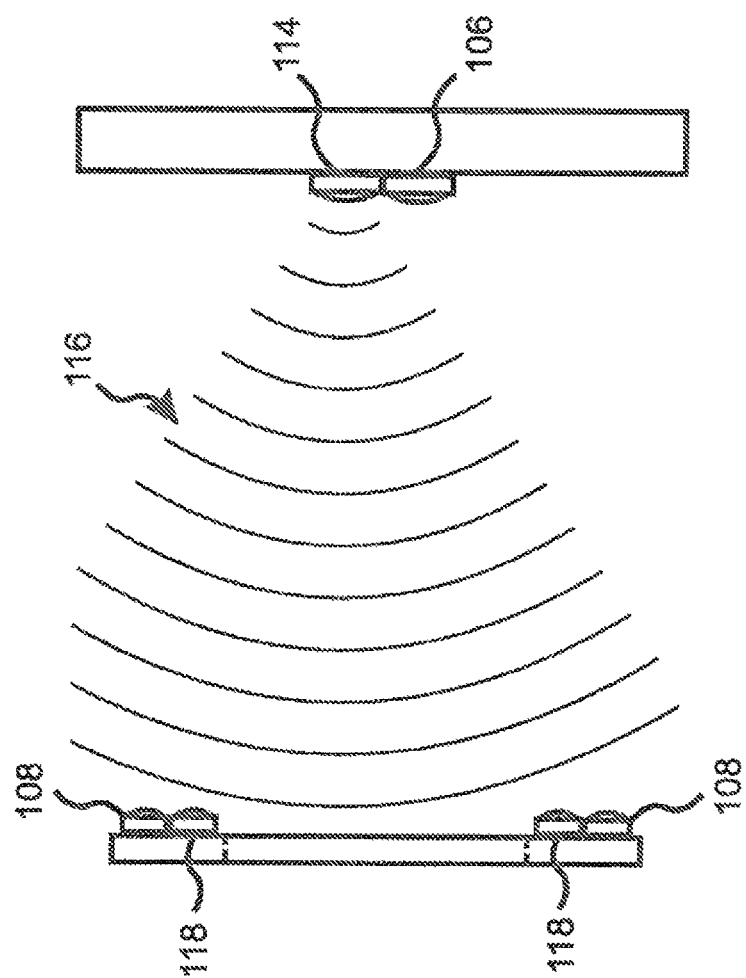
FIG. 1D is a side illustration of an embodiment of the invention similar to FIG. 1A but further including an optical source cooperative with the data receiver and a plurality of optical detectors cooperative with the data transmitting modules.

Embodiments of the present invention provide communication from the data receiving module back to the data transmitting modules by providing a second plurality of optical transmission sources in communication with the data receiving module and an optical detector in communication with the data transmitting modules. With reference to FIG. 1D, other embodiments provide communication from the data receiving module back to the data transmitting modules by providing a single optical transmission source 114 in communication with the data receiving module, the optical transmission source having a diffused output 116, and a plurality of optical detectors 118 in communication with the data transmitting modules.

Figure 2:
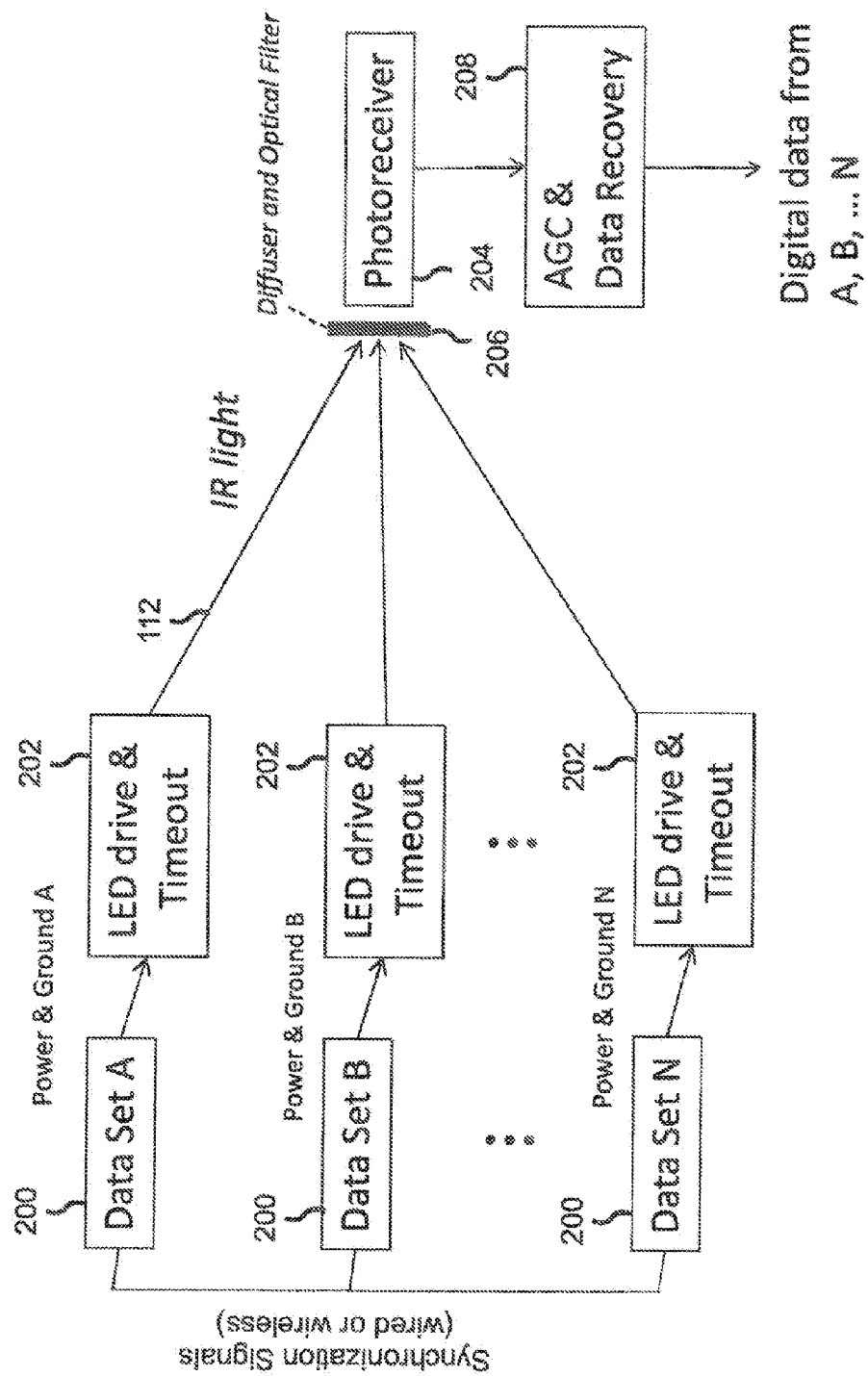
FIG. 2 is a flow diagram which illustrates an embodiment having a plurality of sources in communication with a common detector.

FIG. 2 is a flow diagram which illustrates how a plurality of data sets 200 in an embodiment are supplied to LED modules 202, which then transmit the signals 112 optically to a photoreceiver 204. An automatic gain control and data recovery module 208 then retrieves the data and distinguishes the data according to the various sources. In the embodiment of FIG. 2, a diffuser 206 is included near the photoreceiver 204 so as to ensure that the photoreceiver 204 will not be sensitive to slight misalignments of the optical beams 112. In addition, a plurality of optical filters 206 is included with the diffuser so as to distinguish beams 112 having different optical frequencies and/or different states of circular polarization.

In some embodiments, a beam splitter (not shown) is included which splits each beam 112 into a plurality of beams which are directed through a plurality of optical filters to a plurality of photodetectors. In this way, each of the split beams reaches only one detector, depending on its circular polarization and/or frequency, and the sources of the beams are thereby distinguished.

Figure 5:
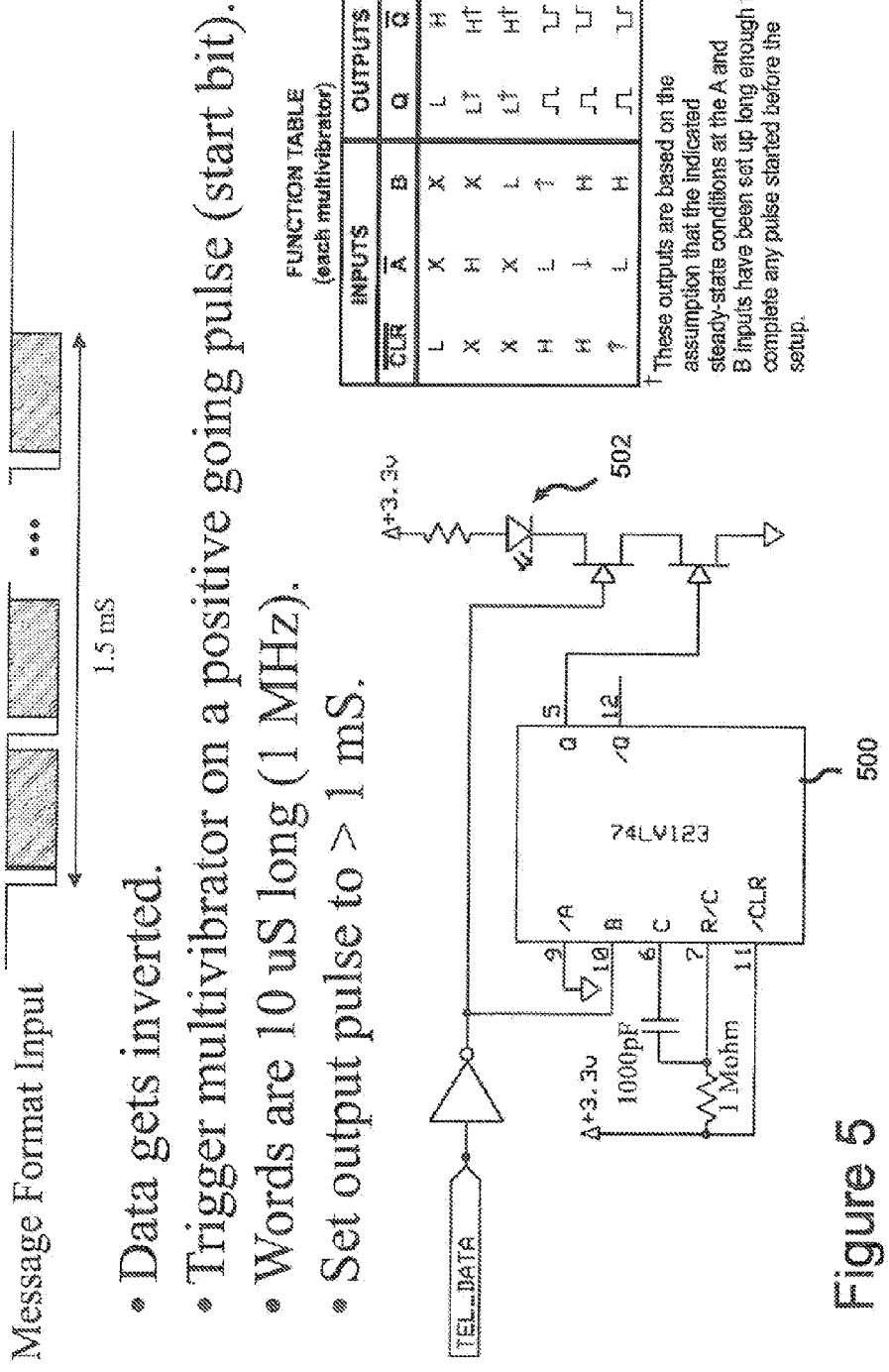
FIG. 5 illustrates a multi-vibrator circuit which is used to prevent failure of one optical source from blocking transmissions from other optical sources.

In the embodiment of FIG. 2, the LED sources 202 include "timeout" circuits, which are discussed in more detail with reference to FIG. 5.

Figure 3:
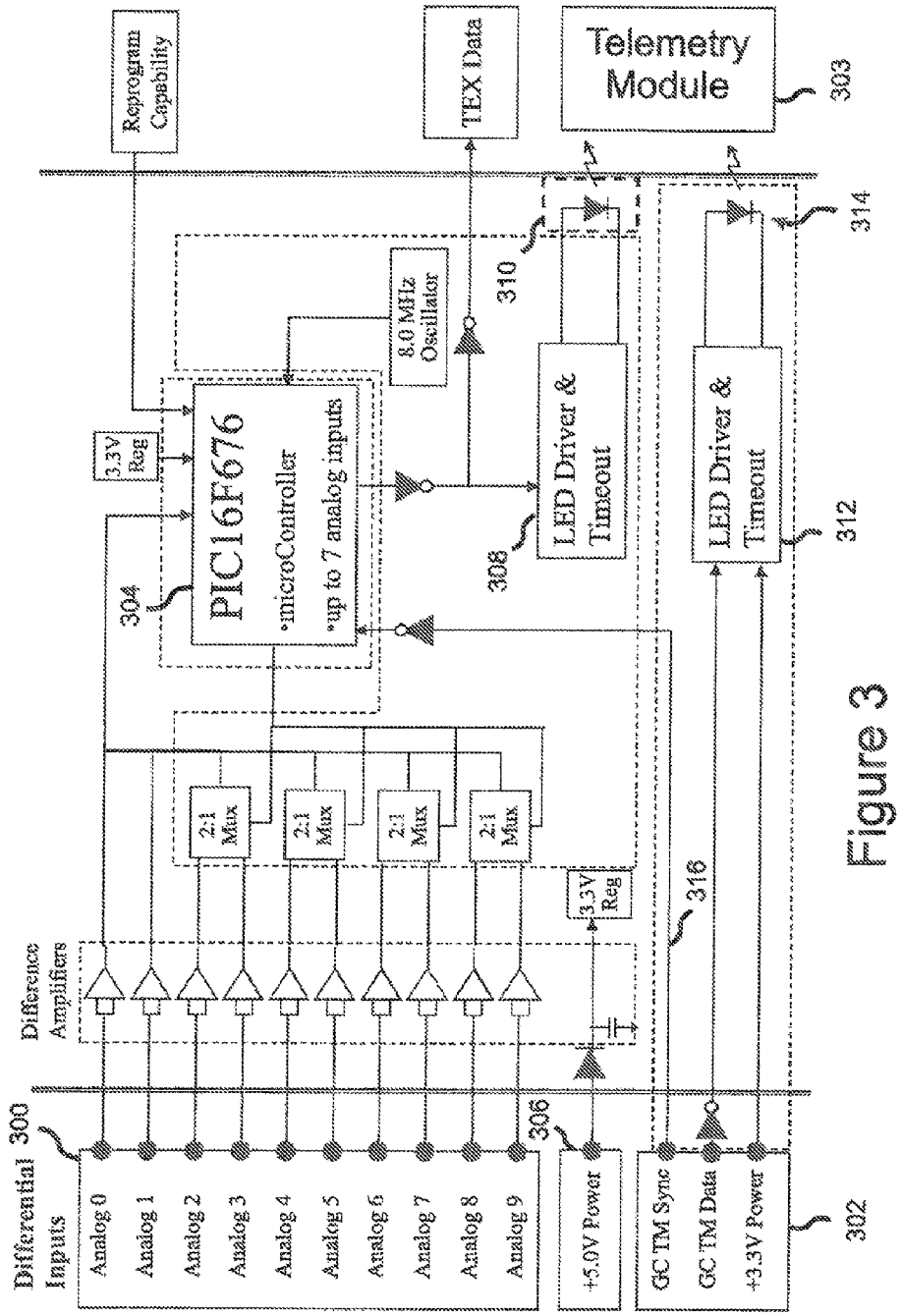
FIG. 3 is a flow diagram illustrating an embodiment in which a missile system monitoring interface and a guidance module both transmit data to a common optical detector.

FIG. 3 provides a detailed flow diagram of an embodiment applicable to a missile. Two data sources 300, 302 are in communication with the common detector 303. The first data source 300, designated as a "TEX" unit, includes a PIC16F676 microcontroller 304 with digital data, and powered by a +5V power source 306, an LED Driver 308, and Timeout circuitry 308 driving an LED 310. The TEX data source 300 monitors, digitizes, and transmits system voltages of the missile.

The second data source 302 transmits data from the guidance computer, and is powered by a +3.3V power supply, including an LED Driver and Timeout circuitry 312 driving a second LED 314. This data source 302 transmits data related to the functioning of the guidance section. The GC TM Sync signal 316 from the guidance system is used for timing synchronization between the two modules.

Figure 4:
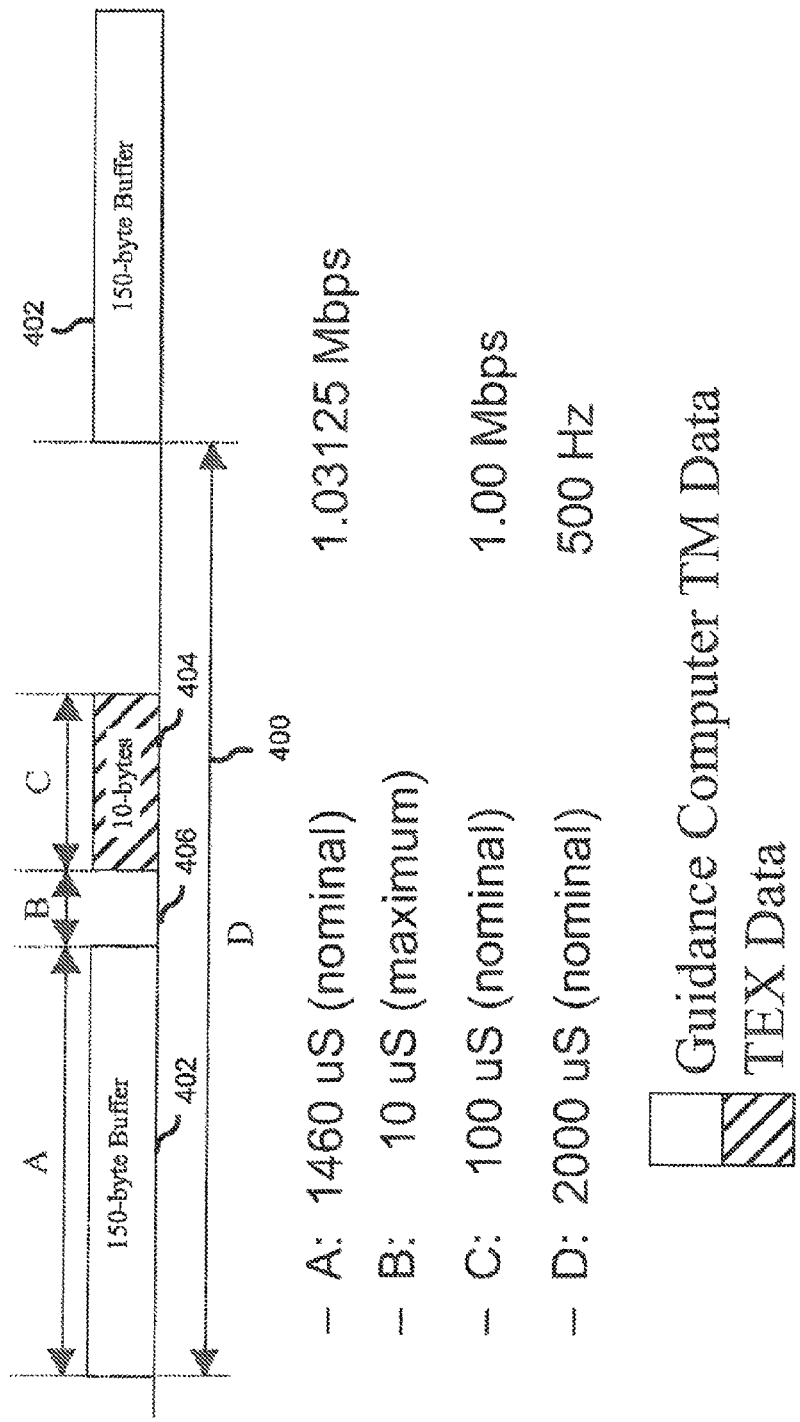
FIG. 4 illustrates a timing control method used to prevent signal overlap and enable distinguishing of the signals from the two optical sources of FIG. 3.

FIG. 4 illustrates the timing synchronization of the embodiment of FIG. 3, whereby transmissions from the guidance computer 302 are interleaved with transmissions from the TEX unit 300. In the embodiment of FIG. 4, the transmissions are contained within 2 ms transmission periods 400, each of which begins with a 150-byte buffer 402 from the guidance computer 302 lasting about 1460 us, followed by a 10-byte transmission from the Tex unit 300 lasting about 100 us, the two transmissions being separated by a gap 406 of no more than 10 us.

Some embodiments of the present invention include timeout circuitry which will cut off an optical source if it fails in a transmitting mode. This will prevent the failed source from blocking all communication, and will allow other sources to continue transmitting to the common detector. In the embodiment of FIG. 5, a multivibrator 500 is triggered by the rising edges of each pulse at the B input, causing a pulse to be emitted at the Q output which enables the LED 502. However, the pulse emitted at the Q output of the multivibrator 500 has a limited duration, so that the LED 502 will be disabled after a preset length of time unless the input at B falls and then rises again. This prevents a failed source from remaining "on" and thereby causing uninterrupted transmission from the LED 502.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An optical communication interface for communication of data from a transmitting module to a receiving module, the data originating from a plurality of data sets, the modules being subject to rotation relative to each other about a shared rotation axis, the interface comprising:
   an optical detector cooperative with the receiving module;
   a plurality of optical transmission sources rotationally fixed to the transmitting module, each of the optical transmission sources being in data communication with a corresponding data set, each data set being in data communication with only one of the optical transmission sources, each of the optical transmission sources being able to encode data onto light transmitted by the optical transmission source and detected by the optical detector; and
   a data-distinguishing mechanism which is able to separate and distinguish the data received by the optical detector from each of the plurality of optical transmission sources.

2. The optical communication interface of claim 1, wherein the optical detector is located along the shared rotation axis and at least one of the optical transmission sources is offset from the shared rotation axis.

3. The optical communication interface of claim 2, wherein at least one of the optical transmission sources is configured to transmit a directed beam of light onto the optical detector, the directed beam remaining directed onto the optical detector at all relative rotational orientations of the transmitting and receiving modules.

4. The optical communication interface of claim 1, wherein light transmitted by at least one of the optical transmission sources is diffused, so that the data encoded onto the diffused light is received by the optical detector regardless of the relative rotational orientations of the transmitting and receiving modules.

5. The optical communication interface of claim 1, further comprising a light diffuser located between the optical transmission source and the optical detector, so as to diffuse light transmitted by at least one of the optical transmission sources and thereby ensure that the light transmitted by the optical transmission source is received by the optical detector.

6. The optical communication interface of claim 1, wherein the source-distinguishing mechanism includes a beam timing discriminator.

7. The optical communication interface of claim 1, wherein the source-distinguishing mechanism includes a baud rate discriminator.

8. The optical communication interface of claim 1, wherein the source-distinguishing mechanism includes a light frequency detector.

9. The optical communication interface of claim 1, wherein the source-distinguishing mechanism includes a light circular polarization state detector.

10. The optical communication interface of claim 1, wherein at least one of the optical transmission sources includes a light emitting diode (LED).

11. The optical communication interface of claim 1, wherein the light transmitted by at least one of the optical transmission sources is infra-red light.

12. The optical communication interface of claim 1, wherein at least one of the optical transmission sources includes a time-out mechanism which is configured to prevent emission of light from the optical transmission source after a specific time period if the optical transmission source fails in a transmitting mode.

13. The optical communication interface of claim 12, wherein the time-out mechanism includes a multivibrator which is triggered by data pulses received from the optical transmission source.

14. The optical communication interface of claim 1, wherein the optical transmission sources do not share a common ground.

15. The optical communication interface of claim 1, further comprising:
   a second plurality of optical detectors cooperative with the transmitting modules;
   a second optical transmission source cooperative with the receiving module; and
   a diffusing mechanism configured to diffuse light emitted by the second optical transmission source so as to cause the light emitted by the second optical transmission source to impinge upon all of the second plurality of optical detectors.

16. A method for communicating data from at least one transmitting module to a receiving module, the data originating from a plurality of data sets, the modules being subject to rotation relative to each other about a shared rotation axis, the method comprising:
   providing an optical detector cooperative with the receiving module;

providing a plurality of optical transmission sources rotationally fixed to the transmitting module, each of the optical transmission sources being in data communication with a corresponding data set, each data set being in data communication with only one of the optical transmission sources;

transmitting light from the optical transmission sources, the light having the data encoded thereon;

detecting the light transmitted by the optical transmission sources using the optical detector; and separating and distinguishing the data received by the optical detector from each of the plurality of optical transmission sources.

17. The method of claim 16, wherein providing the optical detector includes locating the optical detector along the shared rotation axis.

18. The method of claim 17, wherein transmitting light includes transmitting of by at least one of the optical transmission sources of a directed beam of light onto the optical detector, the directed beam of light remaining directed onto the optical detector at all relative rotational orientations of the transmitting and receiving modules.

19. The method of claim 16, wherein transmitting light includes transmitting diffused light, so that the data encoded onto the diffused light is received by the optical detector regardless of the relative rotational orientations of the transmitting and receiving modules.

20. The method of claim 19, wherein transmitting diffused light includes transmitting by the optical transmission source of diffused light.

21. The method of claim 19, wherein transmitting of diffused light includes directing of light through a light diffuser located between the optical transmission source and the optical detector.

22. The method of claim 16, wherein transmitting light includes transmitting light at a first frequency from a first optical transmission source of the plurality of optical transmission sources and transmitting light at a second frequency from a second optical transmission source of the plurality of optical transmission sources, and distinguishing the data includes distinguishing between the frequencies of the light transmitted from the first and second optical transmission sources.

23. The method of claim 16, wherein transmitting light includes transmitting light at two distinct circular polarization states by two of the optical transmission sources, and distinguishing the data includes distinguishing data transmitted by the two optical transmission sources by distinguishing the circular polarization state of the light from each source.

24. The method of claim 16, wherein transmitting light includes transmitting data at two distinct baud rates by two of the optical transmission sources, and distinguishing the data includes distinguishing the baud rates of the data.

25. The method of claim 16, wherein transmitting light includes transmitting light in separated timing intervals, at least two of the optical transmission sources being synchronized so as to ensure that the two sources do not transmit light at the same time, and distinguishing the data includes distinguishing data transmitted by the two optical transmission sources according to the timing intervals of the transmitted light.

26. The method of claim 16, wherein transmitting light includes encoding source-identifying data in the transmitted light from at least two of the optical transmission sources, and distinguishing the data includes distinguishing data transmitted by the two optical transmission sources according to the source-identifying data encoded in the transmitted light.

27. The method of claim 16, wherein transmitting light includes transmitting light from at least one light emitting diode (LED).

28. The method of claim 16, wherein transmitting light includes transmitting infra-red light.

29. The method of claim 16, further comprising providing a time-out mechanism configured to prevent emission of light from at least one of the optical transmission sources after a specified time period if the optical transmission source fails in a transmitting mode.

30. The method of claim 29, wherein the time-out mechanism includes a multivibrator which is triggered by data pulses received from the optical transmission source.

31. The method of claim 16, further comprising:
providing a second plurality of optical detectors cooperative with the transmitting modules;
providing a second optical transmission source cooperative with the receiving module;
transmitting light from the second optical transmission source;
diffusing the light transmitted by the second optical transmission source so as to cause the light transmitted by the second optical transmission source to impinge upon all of the second plurality of optical detectors; and
detecting the light transmitted by the second optical transmission source using the second plurality of optical detectors.

* * * * *